United States Patent Office 3,435,057
Patented Mar. 25, 1969

3,435,057
16α,17α-ETHYLENE AND SUBSTITUTED ETHYLENE PREGNANE DERIVATIVES AND PROCESS
John A. Zderic, Mexico City, Mexico, assignor to Syntex Corporation, Panama, Panama, a corporation of Panama
No Drawing. Filed Jan. 3, 1966, Ser. No. 517,954
Int. Cl. C07c 169/34, 169/30; A61k 17/16
U.S. Cl. 260—397.45
24 Claims

ABSTRACT OF THE DISCLOSURE

New 16α,17α-ethylene and 16α,17α-substituted ethylene derivatives of the pregnane series prepared by the photochemical reaction of an olefin or substituted olefin with a $\Delta^{16}$-ene of the pregnane series useful as anti-inflammatory agents.

---

This invention relates to novel cyclopentanophenanthrene derivatives and to a process for the production thereof. More specifically this invention relates to novel 16α,17α-ethylene and 16α,17α-substituted ethylene derivatives of the pregnane series.

The compounds of the present invention may be represented by the following structural formula:

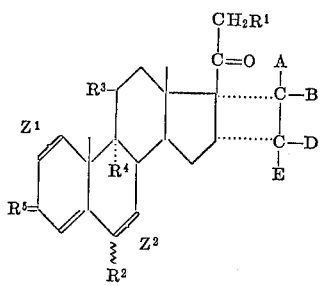

wherein:

$Z^1$ is a carbon-carbon single bond, a carbon-carbon double bond or the group

bridging the C-1 and C-2 carbon atoms, wherein each of X and Y is hydrogen, chloro or fluoro;
$Z^2$ is a carbon-carbon single bond, a carbon-carbon double bond or the group

bridging the C-6 and C-7 carbon atoms, wherein each of X and Y is hydrogen, chloro or fluoro;
$R^1$ is hydroxy, phosphato, tetrahydropyranyloxy or hydrocarbon carboxylic acyloxy group of less than 12 carbon atoms;
$R^2$ is hydrogen, fluoro, chloro or methyl, $R^2$ being in the β-configuration when $Z^2$ is the group

and $R^2$ being in either the α or β-configuration when $Z^2$ is a carbon-carbon single bond;
$R^3$ is hydrogen, β-hydroxy, keto or β-chloro;
$R^4$ is hydrogen, fluoro or chloro, $R^3$ and $R^4$ being the same when $R^3$ is hydrogen or chloro;
$R^5$ is an oxygen atom or the group

in which $R^6$ is hydrogen, tetrahydropyranyl or a hydrocarbon carboxylic acyl group of less than 12 carbon atoms;
each of A and B is hydrogen, chloro, fluoro or an alkyl group of from 1 to 4 carbon atoms
each of D and E is hydrogen, chloro, fluoro, an alkyl group of from 1 to 4 carbon atoms, an alkoxy group of from 1 to 4 carbon atoms or a haloalkyl group of from 1 to 4 carbon atoms, and
A and B taken together are methylene or difluoromethylene.

The compounds of the present invention demonstrate corticoid activity and are useful as anti-inflammatory agents in the treatment of conditions usually responsive to such agents, such as rheumatoid arthritis, contact dermatitis, allergies and the like. These compounds may be administered via usual routes in the standard pharmaceutical compositions and at dosages appropriate for the particular condition being treated.

The compounds of the present invention are prepared in accordance with the following reaction scheme:

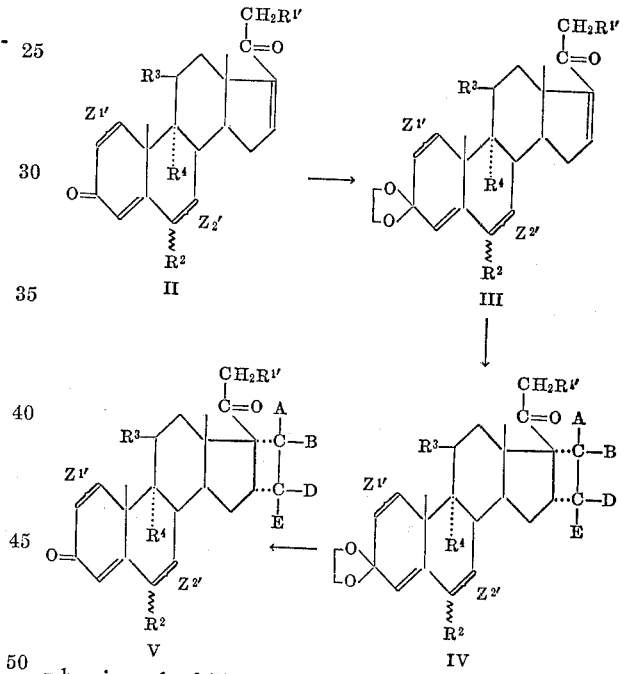

wherein each of $Z^{1\prime}$ and $Z^{2\prime}$ is a methylene or halomethylene group or a carbon-carbon single bond, $R^{1\prime}$ is hydroxy or hydrocarbon carboxylic acyloxy group; all other substitutents being as previously defined.

According to the foregoing transformation, a $\Delta^{16}$-ene of Formula II and an olefin of the formula

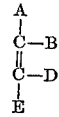

wherein each of A, B, D and E is as previously defined, are irradiated with ultraviolet light of a wavelength in the range of about 270 to 330 mμ in the presence of an inert organic solvent such as benzene, dioxane and the like, preferably benzene. Under these conditions, the olefin adds across the $\Delta^{16}$-double bond with the orientation of the resulting substituted ethylene group with respect to the carbon atoms at 16, 17 positions being predominantly α.

While the time for this reaction will in part be dependent upon the reactivity of the reagents, a reaction time of a few hours, e.g., 4 to 5 hours is generally adequate for ethylene and for substituted olefins whose substituents contribute a positive inductive effect to the double bond, such as alkyl. Longer periods for the reaction time e.g. up to 40 or 50 hours may be required for those olefins whose substituents contribute a negative inductive effect to the double bond, such as fluoro, or chloro. In any event, the course of the reaction may be readily followed through observation of the U.V. spectra of the reaction mixture.

In the practice of the process, a 3-keto-$\Delta^4$-ene is preferably protected by formation of an ethylene ketal as through the action of 2-methyl-2-ethyl-1,3-dioxolane and p-toluenesulfonic acid. When a protecting group is not used, side products may be formed. The side products can be separated, however, from the 16α,17α-compounds by standard procedures, e.g., chromatography.

The $\Delta^{16}$-ene starting material for this conversion is generally readily available or is conveniently prepared by dehydration with acetic anhydride and pyruvic acid of the bis-semicarbazone of the appropriate 17α-hydroxy-3,20-diketo compound.

Those starting materials of Formula II bearing a halomethylene substituent in the 1α,2α-position and/or 6α,7α-position may be obtained by treatment of a $\Delta^1$ or $\Delta^6$ compound wth an alkali or alkaline earth metal salt of an acid having the formula WCXYCOOH in which W is chloro or iodo and X and Y are hydrogen, chloro or fluoro, at least one of X and Y being other than hydrogen. 1α,2α-methylene and/or 6α,7α-methylene groups may be obtained through the reductive dehalogenation of the corresponding 1α, 2α, or 6α,7α-chloromethylene compound with lithium aluminum hydride or, alternatively, through the action of dimethylsulfoxonium methylide in dimethylsulfoxide on a $\Delta^1$ and/or $\Delta^6$ dehydro intermediate.

In performing the process of the present invention, the substituents represented by $R^2$, $R^3$ and $R^4$ may be present in the starting material or may be introduced subsequently by conventional techniques. In practice, $R^1$ is generally hydrocarbon carboxylic acyloxy group, preferably acetoxy.

A 6-fluoro or chloro substituent may be introduced in the 3-keto-$\Delta^4$-ene subsequent to olefin addition by initial formation of a 3-ethoxy-$\Delta^{3,5}$-diene with ethyl orthoformate and fluorination of this intermediate with perchloryl fluoride. Acid isomerization of the 6β-fluoro compound affords the 3-keto-6α-fluoro-$\Delta^4$-ene. In a similar fashion, treatment of the enol ether with N-chlorosuccinimide, followed by acid isomerization, affords the 3-keto-6α-chloro-$\Delta^4$-ene. When $R_2$ is methyl, this substituent is preferably present in the starting material.

In practice, the 16α,17α-olefin addition is performed prior to the introduction of the $\Delta^6$-carbon-carbon double bond. Thus a 16α,17α-ethylene-3-keto-$\Delta^4$-ene is converted to its enol ether as described above and this 3-ethoxy-$\Delta^{3,5}$-diene is then treated wtih 2,3-dichloro-5,6-dicyanobenzoquinone to afford the 3-keto-$\Delta^{4,6}$-diene. Alternatively the 3-keto-$\Delta^4$-ene may be dehydrogenated with chloranil to give the 3-keto-$\Delta^{4,6}$-diene.

After introduction of the 16α,17α-ethylene group, a 21-acetoxy group may be hydrolyzed by reaction with potassium bicarbonate to afford the 21-hydroxy group. The 21-hydroxy compound in turn may be treated with methanesulfonyl chloride and the resultant 21-mesyl compound with sodium iodide to afford the 21-iodo intermediate which by reaction with silver monobasic phosphate affords the 21-phosphato compound.

By treatment of the 21-hydroxy compound with dihydropyran in the presence of an acid catalyst the corresponding 21-tetrahydropyranyloxy compound is obtained. The 21-hydroxy compounds are alternatively esterified by reaction with hydrocarbon carboxylic acyl chlorides or hydrocarbon carboxylic acids to give the 21-esters. The hydrocarbon carboxylic acyl and acyloxy groups of the present invention will contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The substituents represented by $R^3$ and $R^4$ are preferably present in the starting material or may be subsequently introduced via the conventional procedures. Thus an 11β-hydroxy compound is dehydrated to yield the $\Delta^{9(11)}$-ene. This is converted to the 9β,11β-oxido compound through the bromohydrin intermediate. Treatment of the oxide with hydrogen fluoride or hydrogen chloride then yields the 9α-fluoro-11β-hydroxy or 9α-chloro-11β-hydroxy compounds, respectively. Alternatively the $\Delta^{9(11)}$-ene is treated wtih chlorine to yield the 9α-11β-dichloro compound.

The $\Delta^{1,4}$-diene system may be introduced into the molecule subsequent to the completion of the olefin addition and those reactions involving the substituents $R^2$ and $Z^2$. Thus a 3-keto-$\Delta^4$-ene is allowed to react with 2,3-dichloro-5,6-dicyanobenzoquin-one to afford the 3-keto-$\Delta^{1,4}$-diene.

The following examples will tend to illustrate the present invention but are not intended to limit the scope thereof. In the naming of the 16α,17α-ethylene derivatives it is understood that in connection with the substituents D and E, the carbon atom attached to the C-16 carbon atom of the steroid nucleus is designated as 1', and in connection with the substituents A and B, the carbon atom attached to the C-17 carbon atom of the steroid nucleus is designated as 2'.

EXAMPLE 1

To a solution of 5 g. of 11β,17α,21-trihydroxypregn-4-ene-3,20-dione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 11β-hydroxy-17,20;20,21-bis-methylenedioxypregn-4-ene-3-one which is recrystallized from methanol:ether.

A mixture of 1 g. of 11β-hydroxy-17,20;20,21-bis-methylene-dioxy-pregn-4-ene-3-one, 2 g. of chloranil and 10 ml. of xylene is refluxed under an atmosphere of nitrogen for 16 hours. The mixture is cooled, washed with a cold 10% sodium hydroxide solution and then with water, dried over sodium sulfate and evaporated under reduced pressure. The residue is chromatographed on neutral alumina and further purified through recrystallization from acetone:hexane to yield 11β-hydroxy-17,20; 20,21-bismethylenedioxypregna-4,6-dien-3-one.

To a stirred and refluxing solution of 1 g. of 11β-hydroxy - 17,20;20,21-bismethylenedioxypregna-4,6-dien-3-one in 10 ml. of triethyleneglycol dimethyl ether is added in a dropwise fashion and under nitrogen, a 30% w./v. solution of sodium trichloroacetate. When the addition of 5 equivalents of reagent fails to produce an appreciable change in the U.V. spectrum, the addition is stopped. The solution is cooled and filtered and the filtrate is evaporated to dryness under reduced pressure. The residue thus obtained is chromatographed on alumina, eluting with methylene chloride, to yield 6α,7α-dichloromethylene-11β-hydroxy-17,20;20,21-bismethylenedioxypregn-4-en-3-one.

EXAMPLE 2

To a stirred and refluxing solution of 1 g. of 11β-hydroxy - 17,20;20,21-bismethylenedioxypregna-4,6-dien-3-one in 8 ml. of diethyleneglycol dimethyl ether is added in a dropwise fashion over a two-hour period, a solution of 30 equivalents of sodium chlorodifluoroacetate in 30 ml. of diethyleneglycol dimethyl ether. At the end of the reaction period, which may be followed by the U.V. spectra, the mixture is filtered and evaporated in vacuo to dryness. The residue is added to 10% methanolic potassium hydroxide and the mixture is heated briefly at reflux and poured into ice water. The solid which forms is collected, washed with water, dried and chromatographed on alumina, eluting with methylene chloride, to yield 6α,7α-difluoromethylene-11β hydroxy-17,20;20,21-bismethylenedioxypregn-4-en-3-one.

Using the procedure of Example 1 with the above modification the following compounds 6-fluoro-11β-hydroxy-17,20;20,21-bismethylenedioxypregna-4,6-dien-3-one, 9α-fluoro - 11β-hydroxy-17,20;20,21-bismethylenedioxypregna-4,6-dien-3-one afforded respectively, 6β-fluoro-6α,7α-difluoromethylene - 11β-hydroxy - 17,20;20,21-bismethylenedioxy - pregn-4-en-3-one, 9α - fluoro-6α,7α - difluoromethylene - 11β-hydroxy-17,20;20,21-bismethylenedioxy-pregn-4-en-3-one.

EXAMPLE 3

A solution of 0.5 g. 11β-hydroxy-17,20;20,21-bismethylene-dioxypregna-4,6-dien-3-one in 5 ml. of dimethyl sulfoxide is added to a solution of 1 equivalent of dimethylsulfoxonium methylide in dimethylsulfoxide, prepared in the manner of Corey et al., J. Am. Chem. Soc., 87 1353 (1965). The mixture is stirred under nitrogen and at room temperature for 20 hours and then at 50° C. for 7 hours. Fifty milliliters of water are then added and the resulting mixture extracted four times with 50 ml. of ethyl acetate. The combined extracts are washed with $H_2O$ and saturated aqueous sodium chloride solution, dried over sodium sulfate and evaporated to dryness. This residue is then chromatographed on silica, eluting with ether: methylene chloride to yield 6α,7α-methylene-11β-hydroxy-17,20;20,21-bismethylenedioxypregn-4-en-3-one.

EXAMPLE 4

To a solution of 1 g. of 11β-hydroxy-17α,20;20,21-bismethylenedioxypregn-4-en-3-one in 75 ml. of tetrahydrofuran and 125 ml. of liquid ammonia is added over a 20-minute period 0.27 g. of lithium. The mixture is refluxed with stirring for 2½ hours and its color then discharged by the careful addition of ethanol. The resulting solution is allowed to stand at room temperature until the ammonia has evaporated and the residue is next shaken with 100 ml. of 1:1 water:methylene chloride. The aqueous layer is separated and extracted with methylene chloride and the combined extracts and organic layer are dried over magnesium sulfate and evaporated. This residue is dissolved in 100 ml. of 5:9 methylene chloride: acetone and titrated with 8 N chromic acid, maintaining a temperature of 25° C. Thirteen milliliters of water are then added with gentle shaking and the aqueous phase is separated and extracted with methylene chloride. The combined extracts and organic layer are dried over magnesium sulfate and evaporated to dryness to yield 11β-hydroxy - 17α,20;20,21-bismethylenedioxy-5α- pregnan-3-one which may be further purified through recrystallization from ether:hexane.

To a stirred solution of 1 g. of 11β-hydroxy-17α,20;20, 21-bismethylenedioxy-5α-pregnan-3-one and 6.6 g. of p-toluenesulfonic acid in 300 ml. of glacial acetic acid is added, over a 10 minute period, a solution of 1.1 molar equivalent of bromine and 2.45 g. of sodium acetate in 110 ml. of glacial acetic acid. After stirring for an additional 10 minute period, a solution of 75 g. of sodium acetate in 150 ml. of glacial acetic acid is added and stirring is then continued at 20° C. for 5 minutes. The reaction mixture is next poured into 1 liter of ice water and solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid washed alumina with a 3:1 benzene:chloroform to yield 11β-hydroxy-17α,20;20,21-bismethylenedioxy - 5α-pregn-1-en-3-one which may be recrystallized from cyclohexane:ethyl acetate.

A solution of 45 equivalents of sodium chlorodifluoroacetate in 50 ml. of triethylene glycol dimethyl ether is added in a dropwise fashion to a refluxing solution of 11β-hydroxy - 17α,20;20,21-bismethylenedioxy-5α-pregn-1-en-3-one in 10 ml. of triethylene glycol dimethyl ether. Refluxing is discontinued upon the absence of any change in the U.V. spectra and the mixture is then filtered and evaporated to dryness under reduced pressure. The residue is then heated at reflux for one hour with a 1% methanolic solution of potassium hydroxide. At the end of this time, the reaction mixture is neutralized with dilute hydrochloric acid and evaporated to dryness. The residue is then chromatographed on alumina with methylene chloride to yield 1α,2α - difluoromethylene - 11β-hydroxy - 17α,20;20,21 - bismethylenedioxy - 5α-pregnan-3-one.

EXAMPLE 5

To a stirred and refluxing solution of 1 g. of 11β-hydroxy - 17α,20;20,21 - bismethylenedioxy - 5α - pregn - 1-en-3-one in 8 ml. of diethyleneglycol dimethyl ether is added in a dropwise fashion over a two-hour period, a solution of 30 equivalents of sodium chloridifluoroacetate in 30 ml. of diethyleneglycol dimethyl ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 1α, 2α - diuoromethylene - 11β - hydroxy - 17β, 20;20,21-bismethylenedioxy-5α-pregnan-3-one.

Two equivalents of bromine in 15 ml. of glacial acetic acid are added dropwise to a solution of 1 g. of 1α,2α-difluoro methylene - 11β - hydroxy-17α,20;20,21-bismethylenedioxy-5α-pregnan-3-one in 25 ml. of acetic acid containing a few drops of 4 N hydrogen bromide in acetic acid. After being allowed to stand for five hours at room temperature, the mixture is poured into ice water and the solid which forms is collected by filtration, washed well with water and dried. This material is then refluxed for 14 hours with 2 g. of sodium iodide in 40 ml. of 2-butanone, allowed to stand at room temperature for 12 hours, diluted with water, and extracted with ether. These extracts are washed with sodium thiosulfate solution and water and evaporated under reduced pressure. The residue is dissolved in 35 ml. of acetone, and treated under carbon dioxide with an aqueous solution of 11 g. of chromous chloride. After allowing the mixture to stand at room temperature for 20 minutes, water is added and the mixture is extracted with ether. These extracts are washed with water to neutrality, dried and evaporated. The residue is mixed with 0.8 g. of potassium carbonate in 35 ml. of methanol and 7 ml. of water and refluxed for 30 minutes. The mixture is extracted with chloroform and these extracts are chromatographed on alumina with 7:3 chloroform:benzene to yield 1α,2α-difluoromethylene-11β-hydroxy - 17α,20;20,21 - bismethylenedioxypregn - 4-en-3-one which is recrystallized from ether:hexane.

EXAMPLE 6

One gram of 6α,7α-dichloromethylene-11β-hydroxy-17α,20;20,21 - bismethylenedioxypregn - 4 - en - 3 - one in 20 ml. of 60% formic acid is heated at steam bath temperature for one hour. The mixture is cooled, diluted with water and filtered. The solid thus collected is washed with water, dried and recrystallized from acetone: hexane to yield 6α,7α - dichloromethylene - 11β,17α,21-trihydroxypregn-4-ene-3,20-dione.

A mixture of 1 g. of 6α,7α-dichloromethylene-11β,17α, 21 - trihydroxypregn - 4 - ene-3,20-dione, 4 ml. of pyridine and 2 ml. of acetic anhydride is allowed to stand at room temperature for 15 hours. The mixture is then poured into ice water and the solid which forms is collected by filtration, washed with water and dried to yield 6α,7α - dichloromethylene - 11β,17α - dihydroxy - 21-acetoxypregn-4-ene-3,20-dione which may be further purified through recrystallization from acetone:hexane.

Using the same procedure 6α,7α-difluoromethylene-11β hydroxy - 17,20;20,21 - bismethylenedioxypregn - 4 - en-3 - one, 6α,7α - methylene - 11β - hydroxy - 17,20;20,21-bismetylenedioxypregn - 4 - en - 3-one, 1α,2α-methylene - 11β - hydroxy - 17α,20;20,21 - bismethylenedioxypregn - 4 - en - 3 - one, 1α,2α - difluoromethylene - 11β-hydroxy - 17α,20;20,21 - bismethylenedioxypregn - 4 - en-3-one and 1α,2α-dichloromethylene-11β-hydroxy-17α,20; 21-bismethylenedioxypregn-4-en-3-one are converted to respectively 6α,7α - difluoromethylene -11β,17α - dihydroxy - 21 - acetoxypregn - 4 - ene - 3,20 - dione, 6α,7α-methylene - 11β,17α - dihydroxy - 21 - acetoxy - pregn-4 - ene - 3,20 - dione, 1α,2α - methylene - 11β,17α - dihydroxy - 21 - acetoxypregn - 4 - ene - 3,20 - dione and 1α,2α - dichloro - methylene - 11β,17α - dihydroxy - 21-acetoxypregn-4-ene-3,20-dione.

EXAMPLE 7

To a suspension of 1 g. of 9α-fluoro-11β,17α-dihydroxy-21-acetoxypregn-4-ene-3,20-dione in 27 ml. of methanol and 1 ml. of water, under nitrogen is added 1.4 g. of semicarbazide hydrochloride and 0.74 g. of sodium bicarbonate. The mixture is heated at reflux for three hours and then at 45° C. for 20 hours. The suspension is cooled and 36 ml. of water are slowly added. The solid is collected by filtration, washed with water and dried to yield 9α - fluoro - 11β,17α - dihydroxy - 21 - actoxypregn - 4-ene-3,20-bis-semicarbazone which is recrystallized from pyridine:methanol.

A solution of 1 g. of 9α-fluoro-11β,17α-dihydroxy-21-acetoxypregn-4-ene-3,20-bis-semicarbazone in 20 ml. of acetic acid and 1 ml. of acetic anhydride is heated at reflux under nitrogen for 1 hour. The reaction mixture is then concentrated under reduced pressure to a volume of about 12 ml. and treated with 6 ml. of water and 3 ml. of pyruvic acid. The mixture is allowed to stand at room tempertaure for 40 hours and at 60° C. for 2 hours and is then diluted with water and extracted with chloroform. These extracts are washed with water, dilute potassium bicarbonate solution and water, dried over magnesium sulfate and evaporated to dryness under reduced pressure. The residue is chromatographed on neutral alumina with benzene to yield 9α-fluoro-11β-hydroxy-21-acetoxypregna-4,16-diene-3,20-dione which may be recrystallized from acetone:ether.

A mixture of 2.0 g. of 9α-fluoro-11β-hydroxy-21-acetoxypregna-4,16-diene-3,20-dione in 50 ml. of 2-methyl-2-ethyl-1,3-dioxolane and 100 mg. of p-toluenesulfonic acid is heated for one hour. An additional 50 mg. of p-toluenesulfonic acid is added and heated at reflux for another hour while approximately 25 ml. of 2-methyl-2-ethyl-1,3-dioxolane is removed by distillation. The mixture is then cooled, neutralized with pyridine, diluted with water and extracted with chloroform. The extracts are washed to neutrality, dried and evaporated to dryness to yield 3,3-ethylenedioxy - 9α - fluoro - 11β - hydroxy - 21 - acetoxypregna-4,16-dien-20-one which is chromatographed on silica, eluted with ethyl acetate:benzene and recrystallized from methylene chloride.

A mixture of 2.0 g. of 3,3 - ethylenedioxy - 9α - fluoro-11β - hydroxy - 21 - acetoxypregna - 4,16 - dien - 20-one in 140 ml. of benzene is irradiated with a 70 watt Hanau high pressure mercury vapor lamp with a Pyrex filter at room temperature while bubbling ethylene through the solution. At the end of reaction time which may be determined by U.V. spectroscopy, the reaction mixture is evaporated in vacuo to dryness, chromatographed on silica and the product eluted with ethyl acetate: benzene to yield 3,3-ethylene-dioxy-9α-fluoro-11β-hydroxy - 16α,17α - ethylene - 21 - acetoxy-pregn - 4 - en-20-one which is recrystallized from methanol:methylene chloride.

A mixture of 0.5 g. of 3,3-ethylenedioxy-9α-fluoro-11β-hydroxy - 16α,17α - ethylene - 21 - acetoxypregn - 4 - en-20-one in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 9α - fluoro - 11β - hydroxy - 16α,17α - ethylene - 21-acetoxypregn-4-ene-3,20-dione which is recrystallized from acetone:hexane.

Using the same conditions described in Example 7 the starting compounds listed in Table 1 are transformed into those products listed in Table 2.

Table 1

6α-chloro-11β,17α-dihydroxy-21-acetoxypregn-4-ene-3,20-dione;
6α-fluoro-11β,17α-dihydroxy-21-acetoxypregn-4-ene-3,20-dione;
6α-methyl-11β,17α-dihydroxy-21-acetoxypregn-4-ene-3,20-dione;
9α,11β-dichloro-17α-hydroxy-21-acetoxypregn-4-ene-3,20-dione;
6α-methyl-9α-fluoro-11β,17α-dihydroxy-21-acetoxypregn-4-ene-3,20-dione;
6α,9α-difluoro-11β,17α-dihydroxy-21-acetoxypregn-4-ene-3,20-dione;
6α-chloro-9α-fluoro-11β,17α-dihydroxy-21-acetoxypregn-4-ene-3,20-dione;
6α,7α-dichloromethylene-17α-hydroxy-21-acetoxypregn-4-ene-3,20-dione;
6α,7α-methylene-17α-hydroxy-21-acetoxypregn-4-ene-3,20-dione;
6α,7α-difluoromethylene-17α-hydroxy-21-acetoxypregn-4-ene-3,20-dione;
1α,2α-methylene-17α-hydroxy-21-acetoxypregn-4-ene-3,20-dione;
1α,2α-difluoromethylene-17α-hydroxy-21-acetoxypregn-4-ene-3,20-dione;
1α,2α-dichloromethylene-17α-hydroxy-21-acetoxypregn-4-ene-3,20-dione;
6α-fluoro-9α,11β-dichloro-17α-hydroxy-21-acetoxypregn-4-ene-3,20-dione.

TABLE 2

6α-chloro-11β-hydroxy-16α,17α-ethylene-21-acetoxypregn-4-ene-3,20-dione;
6α-fluoro-11β-hydroxy-16α,17α-ethylene-21-acetoxypregn-4-ene-3,20-dione;
6α-methyl-β-hydroxy-16α,17α-ethylene-21-acetoxypregn-4-ene-3,20-dione-;
9α,11β-dichloro-16α,17α-ethylene-21-acetoxypregn-4-ene-3,20-dione;
6α-methyl-9α-fluoro-11β-hydroxy-16α,17α-ethylene-21-acetoxypregn-4-ene-3,20-dione;
6α,9α-difluoro-11β-hydroxy-16α,17α-ethyleen-21-acetoxypregn-4-ene-3,20-dione;
6α-chloro-9α-fluoro-11β-hydroxy-16α,17α-ethylene-21-acetoxypregn-4-ene-3,20-dione;
6α,7α-dichloromethylene-16α,17α-ethylene-21-acetoxypregn-4-ene-3,20-dione;

6α,7α-methylene-16α,17α-ethylene-21-acetoxypregn-4-
ene-3,20-dione;
6α,7α-difluoromethylene-16α,17α-ethylene-21-acetoxy-
pregn-4-ene-3,20-dione;
1α,2α-methylene-16α,17α-ethylene-21-acetoxypregn-4-
ene-3,20-dione;
1α,2α-difluoromethylene-16α,17α-ethylene-21-acetoxy-
pregn-4-ene-3,20-dione;
1α,2α-dichloromethylene-16α,17α-ethylene-21-acetoxy-
pregn-4-ene-3,20-dione;
6α-fluoro-9α,11β-dichloro-16α,17α-ethylene-21-acetoxy-
pregn-4-ene-3,20-dione.

When applying the above method to the starting compounds set forth below and using the olefin indicated, there are obtained the corresponding products set forth below.

| Starting compound | Olefin | Product |
| --- | --- | --- |
| 6α-fluoro-11β,17α-dihydroxy-21-acetoxy-pregn-4-ene-3,20-dione. | Allene | 6α-fluoro-11β-hydroxy-16α,17α(2'-methylene) ethylene-21-acetoxy-pregn-4-ene-3,20-dione. |
| 6α-chloro-11β,17α-dihydroxy-21-acetoxy-pregn-4-ene-3,20-dione. | Butene-2 | 6α-chloro-11β-hydroxy-16α,17α(1',2'-dimethyl)ethylene-21-acetoxy-pregn-4-ene-3,20-dione. |
| 6α,7α-difluoromethylene-11β,17α-dihydroxy-21-acetoxy-pregn-4-ene-3,20-dione. | Allyl-chloride | 6α,7α-difluoromethylene-11β-hydroxy-16α,17α-(1'-chloromethyl)ethylene-21-acetoxy-pregn-4-ene-3,20-dione. |
| 6α,7α-methylene-17α-hydroxy-21-acetoxy-pregn-4-ene-3,20-dione. | 1-chloro-1,2,2-trifluoroethylene. | 6α,7α-methylene-16α,17α-(1'-chloro-1',2',2'-trifluoro)ethylene-21-acetoxypregn-4-ene-3,20-dione. |
| 6α,9α-difluoro-11β,17α-dihydroxy-21-acetoxy-pregn-4-ene-3,20-dione. | 1,1-difluoroallene | 6α,9α-difluoro-11β-hydroxy-16α,17α-(2'-difluoromethylene)-ethylene-21-acetoxy-pregn-4-ene-3,20-dione. |
| 9α-fluoro-11β,17α-dihydroxy-21-acetoxypregn-4-ene-3,20-dione. | Isobutylene | 9α-fluoro-11β-hydroxy-16α,17α-(1',1'-dimethyl)-ethylene-21-acetoxypregn-4-ene-3,20-dione. |
| 6α-fluoro-11β,17α-dihydroxy-21-acetoxypregn-4-ene-3,20-dione. | 1,1-dimethoxyethylene. | 6α-fluoro-11β-hydroxy-16α,17α(1',1'-dimethoxy)ethylene-21-acetoxypregn-4-ene-3,20-dione. |
| 6α-7α-difluoromethylene-11β,17α-dihydroxy-21-acetoxy-pregn-4-ene-3,20-dione. | Vinyl acetate | 6α,7α-difluoromethylene-11β-hydroxy-16α,17α-(1'-acetoxy)ethylene-21-acetoxypregn-4-ene-3,20-dione. |

EXAMPLE 8

Using the same procedure and starting materials as set forth in Example 7 with one exception, namely substituting tetrafluoroethylene for ethylene there are obtained the corresponding 16α,17α-tetrafluoroethylene products for those starting materials of Table 1, namely 6α - chloro - 11β - hydroxy - 16α,17α - tetrafluoroethylene - 21 - acetoxypregn - 4 - ene - 3,20 - dione; 6α - fluoro - 11β - hydroxy - 16α,17α - tetrafluoroethylene - 21 - acetoxypregn - 4 - ene - 3,20 - dione; 6α - methyl - 11β - hydroxy - 16α,17α - tetrafluoroethylene - 21 - acetoxypregn - 4 - ene - 3,20 - dione; 9α,11β - dichloro - 16α,17α - tetrafluoroethylene - 21 - acetoxypregn - 4 - ene - 3,20 - dione; 6α - methyl - 9α - fluoro - 11β - hydroxy - 16α,17α - tetrafluoroethylene - 21 - acetoxypregn - 4 - ene - 3,20 - dione; 9α - fluoro - 11β - hydroxy - 16α,17α - tetrafluoroethylene - 21 - acetoxypregn - 4 - ene - 3,20 - dione; 6α,9α - difluoro - 11β - hydroxy - 16α,17α - tetrafluoroethylene - 21 - acetoxypregn - 4 - ene - 3,20 - dione; 6α - chloro - 9α - fluoro - 11β - hydroxy - 16α,17α-tetrafluoroethylene-21 - acetoxypregn - 4 - ene - 3,20-dione; 6α,7α - dichloromethylene - 16α,17α - tetrafluoroethylene - 21 - acetoxypregn - 4 - ene - 3,20 - dione; 6α,7α - methylene - 16α,17α-tetrafluoroethylene - 21 - acetoxypregn - 4 - ene - 3,20-dione; 6α,7α - difluoromethylene - 16α,17α - tetrafluoroethylene - 21 - acetoxypregn - 4 - ene - 3,20 - dione; 1α,2α - methylene - 16α,17α - tetrafluoroethylene - 21 - acetoxypregn - 4 - ene - 3,20 - dione; 1α,2α - difluoromethylene - 16α,17α - tetrafluoroethylene - 21 - acetoxypregn - 4 - ene - 3,20 - dione; 1α,2α - dichloromethylene - 16α,17α - tetrafluoroethylene - 21 - acetoxypregn - 4 - ene - 3,20 - dione; 6α - fluoro - 9α,11β - dichloro - 16α,17α-tetrafluoroethylene-21-acetoxypregn-4-ene-3,20-dione.

EXAMPLE 9

Using the same procedure and starting materials as set forth in Example 7 with one exception, namely substituting 1,1-difluoroethylene, there are obtained the corresponding 16α,17α-(1',1'-difluoroethylene) products for those starting materials of Table 1, namely 6α-chloro-11β-hydroxy-16α,17α-(1',1'-difluoro)ethylene-
21-acetoxypregn-4-ene-3,20-dione;
6α-fluoro-11β-hydroxy-16α,17α-(1',1'-difluoro)ethylene-
21-acetoxypregn-4-ene-3,20-dione;
6α-methyl-11β-hydroxy-16α,17α-(1',1'-difluoro)ethylene-
21-acetoxy-pregn-4-ene-3,20-dione;
9α,11β-dichloro-16α,17α-(1',1'-difluoro)ethylene-21-
acetoxy-pregn-4-ene-3,20-dione;
6α-methyl-9α-fluoro-11β-hydroxy-16α,17α-(1',1'-
difluoro)ethylene-21-acetoxy-pregn-4-ene-3,20-dione;
9α-fluoro-11β-hydroxy-16α,17α-(1',1'-difluoro)ethylene-
21-acetoxypregn-4-ene-3,20-dione;
6α,9α-difluoro-11β-hydroxy-16α,17α-(1',1'-difluoro)
ethylene-21-acetoxypregn-4-ene-3,20-dione;
6α-chloro-9α-fluoro-11β-hydroxy-16α,17α-(1',1'-difluoro)
ethylene-21-acetoxy-pregn-4-ene-3,20-dione;
6α,7α-dichloromethylene-16α,17α-(1',1'-difluoro)
ethylene-21-acetoxypregn-4-ene-3,20-dione;
6α,7α-methylene-16α,17α-(1',1'-difluoro)ethylene-21-
acetoxypregn-4-ene-3,20-dione;
6α,7α-difluoromethylene-16α,17α-(1',1'-difluoro)
ethylene-21-acetoxypregn-4-ene-3,20-dione;
1α,2α-methylene-16α,17α-(1',1'-difluoro)ethylene-21-
acetoxypregn-4-ene-3,20-dione;
1α,2α-difluoromethylene-16α,17α-(1',1'-difluoro)
ethylene-21-acetoxypregn-4-ene-3,20-dione;
1α,2α-dichloromethylene-16α,17α-(1',1'-difluoro)
ethylene-21-acetoxypregn-4-ene-3,20-dione;
6α-fluoro-9α,11β-dichloro-16α,17α-(1',1'-difluoro)
ethylene-21-acetoxypregn-4-ene-3,20-dione.

EXAMPLE 10

A mixture of 1 g. of 6α-methyl-11β-hydroxy-16α,17α-ethylene-21-acetoxypregn-4-ene-3,20-dione, 2 g. of chloranil and 10 ml. of xylene is refluxed under an atmosphere of nitrogen for 16 hours. The mixture is cooled, washed with a cold 10% sodium hydroxide solution and then with water, dried over sodium sulfate and evaporated under reduced pressure. The residue is chromatographed on neutral alumina and further purified through recrystallization from acetone:hexane to yield 6-methyl-11β-hydroxy-16α,17α-ethylene-21-acetoxypregna-4,6-dien-3,20-dione.

Using the same procedure the following compounds 6α - methyl - 9α - fluoro-11β-hydroxy - 16α,17α - ethylene-21 - acetoxypregn - 4 - ene - 3,20 - dione is converted to 6-methyl - 9α - fluoro - 11β - hydroxy - 16α,17α - ethylene - 21-acetoxypregna-4,6-diene-3,20-dione.

EXAMPLE 11

A mixture of 0.5 g. of 6α,9α-difluoro-11β-hydroxy-16α,17α-ethylene-21-acetoxypregn-4-ene-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 6α,9α - difluoro - 11β - hydroxy - 16α,17α - ethylene-21-acetoxypregna-1,4-diene-3,20-dione which is further purified by recrystallization from acetone:hexane.

Using the above procedure the final products of Examples 7, 8 and 9, namely the 16α,17α-ethylene, the 16α,17α - tetrafluoroethylene, and the 16α,17α - (1',1'- difluoro)ethylene derivatives, are converted into the pregna-1,4-diene compounds shown below to respectively 6α-chloro-11β-hydroxy-16α,17α-ethylene-21-acetoxypregna-1,4-diene-3,20-dione;
6α-fluoro-11β-hydroxy-16α,17α-ethylene-21-acetoxypregna-1,4-diene-3,20-dione;
6α-methyl-11β-hydroxy-16α,17α-ethylene-21-acetoxypregna-1,4-diene-3,20-dione;
9α,11β-dichloro-16α,17α-ethylene-21-acetoxypregna-1,4-diene-3,20-dione;
6α-methyl-9α-fluoro-11β-hydroxy-16α,17α-ethylene-21-acetoxypregna-1,4-diene-3,20-dione;
9α-fluoro-11β-hydroxy-16α,17α-ethylene-21-acetoxypregna-1,4-diene-3,20-dione;
6α,9α-difluoro-11β-hydroxy-16α,17α-ethylene-21-acetoxypregna-1,4-diene-3,20-dione;
6α-chloro-9α-fluoro-11β-hydroxy-16α,17α-ethylene-21-acetoxypregna-1,4-diene-3,20-dione;
6α,7α-dichloromethylene-16α,17α-ethylene-21-acetoxypregna-1,4-diene-3,20-dione;
6α,7α-methylene-16α,17α-ethylene-21-acetoxypregna-1,4-diene-3,20-dione;
6α,7α-difluoromethylene-16α,17α-ethylene-21-acetoxypregna-1,4-diene-3,20-dione;
1α,2α-difluoromethylene-16α,17α-ethylene-21-acetoxypregna-1,4-diene-3,20-dione;
1α,2α-dichloromethylene-16α,17α-ethylene-21-acetoxypregna-1,4-diene-3,20-dione;
6α-fluoro-9α,11β-dichloro-16α,17α-ethylene-21-acetoxypregna-1,4-diene-3,20-dione;
6α-chloro-11β-hydroxy-16α,17α-tetrafluoroethylene-21-acetoxypregna-1,4-diene-3,20-dione;
6α-fluoro-11β-hydroxy-16α,17α-tetrafluoroethylene-21-acetoxypregna-1,4-diene-3,20-dione;
6α-methyl-11β-hydroxy-16α,17α-tetrafluoroethylene-21-acetoxypregna-1,4-diene-3,20-dione;
9α,11β-dichloro-16α,17α-tetrafluoroethylene-21-acetoxypregna-1,4-diene-3,20-dione;
6α-methyl-9α-fluoro-11β-hydroxy-16α,17α-tetrafluoroethylene-21-acetoxypregna-1,4-diene-3,20-dione;
9α-fluoro-11β-hydroxy-16α,17α-tetrafluoroethylene-21-acetoxypregna-1,4-diene-3,20-dione;
6α,9α-difluoro-11β-hydroxy-16α,17α-tetrafluoroethylene-21-acetoxypregna-1,4-diene-3,20-dione;
6α-chloro-9α-fluoro-11β-hydroxy-16α,17α-tetrafluoroethylene-21-acetoxypregna-1,4-diene-3,20-dione;
6α,7α-dichloromethylene-16α,17α-tetrafluoroethylene-21-acetoxypregna-1,4-diene-3,20-dione;
6α,7α-methylene-16α,17α-tetrafluoroethylene-21-acetoxypregna-1,4-diene-3,20-dione;
6α,7α-difluoromethylene-16α,17α-tetrafluoroethylene-21-acetoxypregna-1,4-diene-3,20-dione;
1α,2α-methylene-16α,17α-tetrafluoroethylene-21-acetoxypregna-1,4-diene-3,20-dione;
1α,2α-difluoromethylene-16α,17α-tetrafluoroethylene-21-acetoxypregna-1,4-diene-3,20-dione;
1α,2α-dichloromethylene-16α,17α-tetrafluoroethylene-21-acetoxypregna-1,4-diene-3,20-dione;
6α-fluoro-9α,11β-dichloro-16α,17α-tetrafluoroethylene-21-acetoxypregna-1,4-diene-3,20-dione.

6α-chloro - 11β - hydroxy - 16α,17α - (1′,1′ - difluoro)ethylene - 21 - acetoxypregna - 1,4 - diene-3,20-dione; 6α-fluoro - 11β - hydroxy - 16α,17α - (1′,1′-difluoro)ethylene-21 - acetoxypregna - 1,4 - diene - 3,20 - dione; 6α-methyl-11β - hydroxy - 16α,17α - (1′,1′ - difluoro)ethylene-21-acetoxypregna - 1,4 - diene - 3,20 - dione; 9α,11β-dichloro-16α,17α - (1′,1′ - difluoro)ethylene - 21 - acetoxypregna-1,4 - diene - 3,20 - dione; 6α - methyl - 9α - fluoro-11β-hydroxy - 16α,17α - (1′,1′ - difluoro)ethylene - 21 - acetoxypregna - 1,4 - diene - 3,20 - dione; 9α - fluoro - 11β - hydroxy - 16α,17α - (1′,1′ - difluoro)ethylene - 21 - acetoxypregna - 1,4 - diene - 3,20 - dione; 6α,9α-difluoro-11β-hydroxy - 16α,17α(1′,1′ - difluoro)ethylene - 21 - acetoxypregna - 1,4 - diene - 3,20 - dione; 6α - chloro-9α-fluoro-11β - hydroxy - 16α,17α - (1′,1′ - difluoro)ethylene - 21 - acetoxypregna - 1,4 - diene - 3,20 - dione; 6α,7α-dichloromethylene - 16α,17α - (1′,1′-difluoro)ethylene-21-acetoxypregna - 1,4 - diene-3,20-dione; 6α,7α-methylene-16α,17α-(1′,1′ - difluoro)ethylene - 21 - acetoxypregna-1,4-diene-3,20 - dione; 6α,7α-difluoromethylene - 16α,17α - (1′,1′-difluoro)ethylene - 21 - acetoxypregna - 1,4 - diene-3,20-dione; 6α - fluoro - 9α,11β - dichloro - 16α,17α - (1′,1′-difluoro)ethylene - 21 - acetoxypregna-1,4-diene-3,20-dione.

EXAMPLE 12

One gram of 6α,9α - difluoro - 11β - hydroxy - 16α,17α-ethylene - 21 - acetoxypregna - 1,4 - diene - 3,20 - dione is allowed to stand at room temperature for 15 hours with 1 g. of potassium bicarbonate in 10 ml. of water and 90 ml. of methanol. At the end of this time the methanol is evaporated under reduced pressure and the residue is extracted with ethyl acetate and water. Evaporation of the ethyl acetate from these extracts yields 6α,9α-difluoro-11β, 21-dihydroxy-16α,17α-ethylenepregna - 1,4 - diene - 3,20-dione which is collected by filtration and recrystallized from acetone:hexane.

Using the same procedure the 21-acetoxy compounds listed in Examples 7, 8 and 9 are converted to the corresponding 21-hydroxy compounds.

EXAMPLE 13

A solution of 1 g. of sodium borohydride in 3 ml. of water is added to an ice-cooled solution of 1 g. of 6α,9α-difluoro-11β - hydroxy-16α,17α-ethylene-21-acetoxypregn-4-ene-3,20-dione in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 6α,9α-difluoro-3β,11β-dihydroxy-16α,17α-ethylene - 21 - acetoxypregn-4-en-20-one which may be further purified by recrystallization from acetone:hexane.

Two milliliters of dihydropyran are added to a solution of 1 g. of 6α,9α-difluoro-3β,11β-dihydroxy-16α,17α-ethylene-21-acetoxypregn-4-en-20-one in 15 ml. of benzene. About 1 ml. is removed by distillation to remove moisture and 0.4 g. of p-toluenesulfonyl chloride is added to the cooled solution. This mixture is allowed to stand at room temperature for 4 days, and is then washed with aqueous sodium carbonate solution and water, dried and evaporated. The residue is chromatographed on neutral alumina, eluting with hexane to yield 3β-tetrahydropyranyloxy-6α,9α-difluoro-11β-hydroxy - 16α,17α - ethylene 21-acetoxypregn-4-en-20-one which is recrystallized from pentane.

Using the same procedure the following compounds 6α, 7α - difluoromethylene - 11β - hydroxy - 16α,17α - tetrafluoroethylene - 21 - acetoxypregn - 4 - ene - 3,20 - dione, 1α,2α - dichloromethylene - 11β - hydroxy - 16α,17α-ethylene - 21 - acetoxypregn - 4 - ene - 3,20 - dione; 6α-fluoro-11β - hydroxy - 16α,17α - ethylene - 21 - acetoxypregn - 4-ene-3,20-dione, and 6α-fluoro-11β-hydroxy-16α,17α-tetrafluoroethylene - 21 - acetoxypregn - 4 - ene - 3,20 - dione are converted to 3β-tetrahydropyranyloxy-6α,7α-difluoromethylene - 11β - hydroxy - 16α,17α tetrafluoroethylene-21 - acetoxypregn - 4 - ene - 3,20 - dione, 1α,2α-dichloromethylene - 3β - tetrahydropyranyloxy - 11β - hydroxy-16α,17α - ethylene - 21 - acetoxypregn-4-ene-3,20-dione, 3β - tetrahydropyranyloxy - 6α - fluoro - 11β - hydroxy-16α,17α - ethylene - 21 - acetoxypregn - 4 - ene-3.20-dione, and 3β - tetrahydropyranyloxy - 6α - fluoro-11β-hydroxy-16α,17α - tetrafluoroethylene - 21 - acetoxypregn-4-ene-3,20-dione.

EXAMPLE 14

Two milliliters of dihydropyran are added to a solution of 1 g. of 6α,9α-difluoro-11β,21-dihydroxy-16α,17α-ethylenepregna-1,4-diene - 3,20 - dione in 15 ml. of benzene.

About 1 ml. is removed by distillation to remove moisture and 0.4 g. of p-toluenesulfonyl chloride is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 6α,9α-difluoro-11β-hydroxy - 16α,17α - ethylene - 21 - tetrahydropyranyloxypregna - 1,4 - diene - 3,20 - dione which is recrystallized from pentane.

Using the same procedure the following compounds 6α-fluoro - 11β,21 - dihydroxy - 16α,17α - ethylenepregna-1,4 -diene 3,20 - dione, 9α - fluoro-11β,21-dihydroxy - 16α, 17α - ethylene - pregna - 1,4 - diene - 3,20 - dione are converted to 6α-fluoro-11β-hydroxy - 16α,17α - ethylene-21-tetrahydropyranyloxypregna - 1,4 - diene - 3,20-dione, and 9α - fluoro - 11β - hydroxy - 16α,17α - ethylene - 21 - tetrahydropyranyloxypregna - 1,4 - diene - 3,20 - dione, respectively.

EXAMPLE 15

A mixture of 1 g. of 6α-fluoro-11β,21-dihydroxy-16α,17α-ethylenepregna-1,4-diene-3,20-dione in 5 ml. of pyridine and 0.5 g. of methanesulfonyl chloride is allowed to stand at room temperature for 24 hours and is then diluted with water and filtered. The solid thus collected is dried and recrystallized from acetone:hexane to yield 6α-fluoro - 11β - hydroxy - 16α,17α-ethylene-21-methanesulfonyloxypregna-1,4-diene-3,20-dione.

To a stirred solution of 1 g. of above solid in 10 ml. of dry acetone is added 1 g. of sodium iodide. The mixture is allowed to stand at room temperature for four hours. The precipitate is collected and evaporated to dryness to yield 6α-fluoro-11β-hydroxy-16α,17α-ethylene-21-iodopregna-1,4-diene-3,20-dione.

A mixture of 1 g. of 6α-fluoro-11β-hydroxy-11α,17α-ethylene - 21 - iodopregna-1,4-diene-3,20-dione and 1.1 molar equivalents of silver monobasic phosphate in 60 ml. of acetonitrile is heated at reflux for 2 hours. The mixture is then filtered and evaporated to dryness to yield 6α - fluoro-11β-hydroxy-16α,17α-ethylene-21-phosphatopregna-1,4-diene-3,20-dione which may be recrystallized from methanol:ethyl acetate. This product, dissolved in methanol may be triturated with aqueous sodium hydroxide to yield the corresponding monosodium and disodium salts.

EXAMPLE 16

A mixture of 1 g. of 6α-fluoro-11β,21-dihydroxy-16α,17α-ethylenepregna-1,4-diene-3,20-dione, 4 ml. of pyridine and 2 ml. of propionic anhydride was kept at room temperature overnight and then poured over ice water to give 6-fluoro-11β - hydroxy-16α,17α-ethylene-21-propionyloxy-pregna-1,4-diene-3,20-dione. The precipitate was filtered, washed with water, dried and recrystallized from acetone:hexane.

Using the above procedure the 21-hydroxy compounds listed in Example 12 are treated with acetic anhydride, propionic anhydride, caproic anhydride, enanthic anhydride and cyclopentylpropionic anhydride, respectively, to obtain the 21-acetates, 21-propionates, 21-caproates, 21-enianthates, and 21-cyclopentylpropionates.

Again using the above procedure and the 3β-hydroxy compounds prepared in Example 13 there are obtained the following 3β-acetates, 3β-propionates, 3β-caproates, 3β-enanthates and 3β-cyclopentylpropionates of 6α,9α-difluoro - 3β,11β-dihydroxy-16α,17α-ethylene-21-acetoxy-pregn-4-en-3-one, 6α,7α-difluoromethylene - 3β,11β-dihydroxy-16α,17α-tetrafluoroethylene-21-acetoxypregn-4 - en-20-one, 1α,2α - dichloromethylene - 3β,11β-dihydroxy-16α,17α-ethylene-21-acetoxypregn-4-en-3-one, 6α-fluoro-3β,11β - dihydroxy - 16α,17α-ethylene-21-acetoxypregn-4-en-20-one, and 6α-fluoro-3β,11β-dihydroxy-16α,17α-tetrafluoroethylene-21-acetoxypregn-4-en-20-one.

I claim:
1. A compound of the formula:

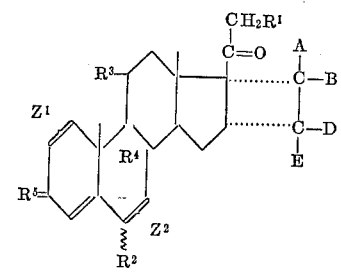

wherein:
$Z^1$ is a carbon-carbon single bond, a carbon-carbon double bond or the group

bridging the C-1 and C-2 carbon atoms, wherein each of X and Y is hydrogen, chloro or fluoro;
$Z^2$ is a carbon-carbon single bond, a carbon-carbon double bond or the group

bridging the C-6 and C-7 carbon atoms, wherein each of X and Y is hydrogen, chloro or fluoro;
$R^1$ is hydroxy, phosphato, tetrahydropyranyloxy or hydrocarbon carboxylic acyloxy group of less than 12 carbon atoms;
$R^2$ is hydrogen, fluoro, chloro or methyl, $R^2$ being in the β-configuration when $Z^2$ is the group

and $R^2$ being in either the α or β-configuration when $Z^2$ is a carbon-carbon single bond;
$R^3$ is hydrogen, β-hydrogen, keto or β-chloro;
$R^4$ is hydrogen, fluoro or chloro, $R^3$ and $R^4$ being the same when $R^3$ is hydrogen or chloro;
$R^5$ is an oxygen or the group

in which $R^6$ is hydrogen, tetrahydropyranyl or a hydrocarbon carboxylic acyl group of less than 12 carbon atoms;
each of A and B is hydrogen, chloro, fluoro or an alkyl group of from one to four carbon atoms;
each of D and E is hydrogen, chloro, fluoro, an alkyl group of from one to four carbon atoms, an alkoxy group of from one to four carbon atoms or a haloalkyl group of from one to four carbon atoms; and A and B taken together are methylene or difluoromethylene, provided that whenever $Z^1$ is the group

that $Z^2$ is a single bond or a double bond.
2. Compounds according to claim 1 wherein $R^1$ is hydroxy or a hydrocarbon carboxylic acyloxy group of less than 12 carbon atoms;
$R^2$ is hydrogen, fluoro or methyl;
$R^3$ is hydroxy;
$R^4$ is hydrogen or fluoro;
$R^5$ is oxygen; and
$Z^1$ and $Z^2$, independent of one another, is a carbon-carbon single bond or a carbon-carbon double bond; and each of A, B, D and E is hydrogen.

3. Compound according to claim 2 wherein
$R^1$ is hydroxy;
$R^2$ is hydrogen;
$R^4$ is fluoro; and
each of $Z^1$ and $Z^2$ is a carbon-carbon single bond.

4. Compounds according to claim 1 wherein
$R^1$ is hydroxy;
$R^2$ is hydrogen;
$R^4$ is fluoro;
$Z^1$ is a carbon-carbon double bond; and
$Z^2$ is a carbon-carbon single bond.

5. Compound according to claim 2 wherein
$R^1$ is hydroxy;
$R^2$ is fluoro;
$R^4$ is hydrogen; and
each of $Z^1$ and $Z^2$ is a carbon-carbon single bond.

6. Compound according to claim 2 wherein
$R^1$ is hydroxy;
$R^2$ is fluoro;
$R^4$ is hydrogen;
$Z^1$ is carbon-carbon double bond; and
$Z^2$ is carbon-carbon single bond.

7. Compound according to claim 2 wherein
$R^1$ is hydroxy;
each of $R^2$ and $R^4$ is fluoro; and
each of $Z^1$ and $Z^2$ is a carbon-carbon single bond.

8. Compound according to claim 2 wherein
$R^1$ is hydroxy;
each of $R^2$ and $R^4$ is fluoro;
$Z^1$ is a carbon-carbon double bond; and
$Z^2$ is a carbon-carbon single bond.

9. Compound according to claim 2 wherein
$R^1$ is hydroxy;
$R^2$ is methyl;
$R^4$ is hydrogen;
$Z^1$ is a carbon-carbon single bond; and
$Z^2$ is a carbon-carbon double bond.

10. Compound according to claim 2 wherein
$R^1$ is hydroxy;
$R^2$ is methyl;
$R^4$ is hydrogen; and
each of $Z^1$ and $Z^2$ is a carbon-carbon double bond.

11. Compound according to claim 2 wherein
$R^1$ is hydroxy;
$R^2$ is methyl;
$R^4$ is fluoro; and
each of $Z^1$ and $Z^2$ is a carbon-carbon double bond.

12. Compound according to claim 2 wherein
$R^1$ is hydroxy;
$R^2$ is methyl;
$R^4$ is fluoro;
$Z^1$ is a carbon-carbon single bond; and
$Z^2$ is a carbon-carbon double bond.

13. Compounds according to claim 1 wherein
$R^1$ is hydroxy;
$R^2$ is hydrogen or fluoro;
each of $R^3$ and $R^4$ is chloro;
$R^5$ is oxygen;
$Z^1$ is a carbon-carbon single bond or a carbon-carbon double bond; and
$Z^2$ is a carbon-carbon single bond;
each of A, B, D, and E is hydrogen.

14. Compound according to claim 13 wherein
$R^2$ is hydrogen; and
$Z^1$ is a carbon-carbon single bond.

15. Compound according to claim 13 wherein
$R^2$ is hydrogen; and
$Z^1$ is a carbon-carbon double bond.

16. Compound according to claim 13 wherein
$R^2$ is fluoro; and
$Z^1$ is carbon-carbon single bond.

17. Compound according to claim 13 wherein
$R^2$ is fluoro; and
$Z^1$ is a carbon-carbon double bond.

18. Compounds according to claim 1 wherein
$R^1$ is hydroxy or a hydrocarbon carboxylic acyloxy group of less than 12 carbon atoms;
$R^2$ is hydrogen;
$R^3$ is hydroxy;
$R^4$ is hydrogen or fluoro;
$R^5$ is oxygen;
$Z^1$ is a carbon-carbon double bond or a carbon-carbon single bond; and
$Z^2$ is the difluoromethylene group.

19. Compounds according to claim 18 wherein
$R^1$ is hydroxy;
$R^4$ is hydrogen; and
$Z^1$ is the carbon-carbon single bond.

20. Compounds according to claim 18 wherein
$R^1$ is hydroxy;
$R^4$ is hydrogen; and
$Z^1$ is the carbon-carbon double bond.

21. Compounds according to claim 18 wherein
$R^1$ is hydroxy;
$R^4$ is fluoro; and
$Z^1$ is the carbon-carbon single bond.

22. Compounds according to claim 18 wherein
$R^1$ is hydroxy;
$R^4$ is fluoro; and
$Z^1$ is the carbon-carbon double bond.

23. A compound selected from those of the formula:

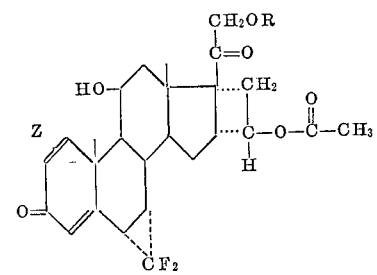

wherein, R is hydrogen or hydrocarbon carboxylic acyl group of less than 12 carbon atoms and Z is a carbon-carbon single bond or a carbon-carbon double bond.

24. A compound according to claim 23 wherein R is acetyl and Z is a carbon-carbon single bond.

References Cited

UNITED STATES PATENTS 3,338,928   8/1967   Beard et al.

HENRY A. FRENCH, *Primary Examiner.*

U.S. Cl. X.R.

260—239.55, 397.47, 999; 204—158

UNITED STATES PATENT OFFICE
CERTIFICATE OF CORRECTION

Patent No. 3,435,057                                      March 25, 1969

John A. Zderic

It is certified that error appears in the above identified patent and that said Letters Patent are hereby corrected as shown below:

Column 4, line 26, "5,6-dicyanobenzoquin-one" should read -- 5,6-dicyanobenzoquinone --. Column 6, line 43, "17β,20;20,21-" should read -- 17α,20;20,21- --. Column 7, line 19, "bismetylenedioxypregn" should read -- bismethylenedioxypregn --. Column 8, line 64, "6α-methyl-β-hydroxy" should read -- 6α-methyl-11β-hydroxy --; line 70, "ethyleen" should read -- ethylene --. Column 11, lines 25 to 28, cancel "1α,2α-difluoromethylene-16α,17α-ethylene-21-acetoxypregna-1,4-diene-3,20-dione;
    1α,2α-dichloromethylene-16α,17α-ethylene-21-acetoxypregna-1,4-diene-3,20-dione;"; lines 53 to 57, cancel "1α,2α-methylene-16α,17α-tetrafluoroethylene-21-acetoxypregna-1,4-diene-3,20-dione;
    1α,2α-difluoromethylene-16α,17α-tetrafluoroethylene-21-acetoxypregna-1,4-diene-3,20-dione;
    1α,2α-dichloromethylene-16α,17α-tetrafluoroethylene-21-acetoxypregna-1,4-diene-3,20-dione;". Column 12, line 63, "16α,17α tetrafluoroethylene" should read -- 16α,17α-tetrafluoroethylene --; line 68, "4-ene-3.20-dione" should read -- 4-ene-3,20-dione --. Column 13, line 36, "11α,17α-" should read -- 16α,17α- --; line 54, "6-fluoro-" should read -- 6α-fluoro --; line 63, "enianthates" should read -- enanthates --. Column 14, line 41, "β-hydrogen" should read -- β-hydroxy --.

Signed and sealed this 14th day of April 1970.

(SEAL)
Attest:

EDWARD M. FLETCHER, JR.                         WILLIAM E. SCHUYLER, JR.
Attesting Officer                                     Commissioner of Patents